US006963582B1

(12) United States Patent
Xu

(10) Patent No.: US 6,963,582 B1
(45) Date of Patent: Nov. 8, 2005

(54) APPLYING MODIFIED MOBILE INTERNET PROTOCOL (IP) IN A WIRELESS MOBILE DATA NETWORK INTERFACE

(75) Inventor: Yingchun Xu, Buffalo Grove, IL (US)

(73) Assignee: UTStarcom, Incorporated, Alameda, CA (US)

( * ) Notice: Subject to any disclaimer, the term of this patent is extended or adjusted under 35 U.S.C. 154(b) by 0 days.

(21) Appl. No.: 09/515,560

(22) Filed: Feb. 29, 2000

Related U.S. Application Data

(63) Continuation-in-part of application No. 08/887,313, filed on Jul. 3, 1997.

(51) Int. Cl.[7] ............................................. H04J 3/22
(52) U.S. Cl. ...................... 370/466; 370/469; 370/401; 370/392
(58) Field of Search ............................... 370/319, 320, 370/321, 335, 336, 337, 342, 343, 344, 349, 370/465, 466, 469, 401, 392, 390, 389, 474, 370/328, 338, 400, 467; 709/225, 226, 227

(56) References Cited

U.S. PATENT DOCUMENTS

| | | | | |
|---|---|---|---|---|
| 5,970,059 | A * | 10/1999 | Ahopelto et al. | 370/338 |
| 6,240,514 | B1 * | 5/2001 | Inoue et al. | 713/153 |
| 6,366,561 | B1 * | 4/2002 | Bender | 370/238 |
| 6,377,571 | B1 * | 4/2002 | Tai | 370/355 |
| 6,452,920 | B1 * | 9/2002 | Comstock | 370/349 |
| 6,496,704 | B2 * | 12/2002 | Yuan | 455/466 |
| 6,522,880 | B1 * | 2/2003 | Verma et al. | 455/436 |
| 6,535,493 | B1 * | 3/2003 | Lee et al. | 370/329 |
| 6,651,105 | B1 * | 11/2003 | Bhagwat et al. | 709/239 |
| 2003/0035438 | A1 * | 2/2003 | Larsson | 370/466 |

OTHER PUBLICATIONS

W. Townsley, A. Valencia, G. Pall, G. Zorn, and B. Palter, Networking Working Group, "Layer Two Tunneling Protocol L2TP", Aug. 1999, p. 9.*

Darryl Schick, 1999 Wireless Symposium, *3G Wideband CDMA Technology, Part 1: Overview of IMT-2000*, 1999, pp. 1-29.

G. Montenegro, ed., Network Working Group, *Reverse Tunneling for Mobile IP Status*, May 1998, pp. 1-33.

* cited by examiner

*Primary Examiner*—Ricky Ngo
*Assistant Examiner*—Duc Duong
(74) *Attorney, Agent, or Firm*—McDonnell Boehnen Hulbert & Berghoff LLP

(57) ABSTRACT

A wireless communication system for mobile devices including an air interface and a packet network. A modified mobile IP interface is utilized to provide a communication protocol for the wireless air interface. The wireless communication protocol is interfaced to a Generic Routing Encapsulation data tunneling protocol to transport communications through a packet switched data communication network. The Generic Routing Encapsulation header encapsulates the communication and control information and also accepts a network address as a session ID values to identify different communication sessions.

8 Claims, 2 Drawing Sheets

| 0 0 | 1 | 2 | 3 | 4 | 5 | 6 | 7 | 8 | 9 | 1 0 | 1 | 2 | 3 | 4 | 5 | 6 | 7 | 8 | 9 | 2 0 | 1 | 2 | 3 | 4 | 5 | 6 | 7 | 9 | 3 0 | 1 | 2 | Bit Num. |
|---|---|---|---|---|---|---|---|---|---|---|---|---|---|---|---|---|---|---|---|---|---|---|---|---|---|---|---|---|---|---|---|---|
| C | R | K | S | s | Recur | | | | | Flags | | | | | Ver | | | Protocol Type | | | | | | | | | | | | | | Octet: 1-4 |
| Session Id  100 | | | | | | | | | | | | | | | | | | | | | | | | | | | | | | | | Octet: 5-8 |
| Sequence Number | | | | | | | | | | | | | | | | | | | | | | | | | | | | | | | | Octet: 9-12 |

Modified GRE Header    ↳ 96

APPLYING MODIFIED MOBILE INTERNET PROTOCOL (IP) IN A WIRELESS MOBILE DATA NETWORK INTERFACE

CROSS-REFERENCE TO RELATED APPLICATION

This is a continuation-in-part of the patent application of Yingchun Xu et al., entitled Network Access Methods, Including Direct Wireless to Internet Access, application Ser. No. 08/887,313 filed Jul. 3, 1997, the entire contents of which are fully incorporated by reference herein.

BACKGROUND OF THE INVENTION

A. Field of the Invention

This invention relates generally to systems that provide mobile Internet Protocol networking, wherein a mobile communications device such as a portable laptop computer or handheld personal digital assistant device may communicate with a host computer on a data packet network. More particularly, the invention relates to the interfaces between mobile and IP communications networks.

B. Description of Related Art

Packet switched data networks can be used to carry data traffic to and from mobile communications devices, such as a laptop computer or handheld personal digital assistant ("PDA") computer. With these portable devices and mobile wireless radio capability, users may freely move about a geographic area, yet still be able to remotely access packet data networks such as the Internet to view information on the World Wide Web or access their home networks to access E-mail and data. Using the new class of portable PDA devices such as 3Com's Palm VII equipped with a cellular telephone modem and a wireless radio network will allow a new mobile computing network paradigm and further expand networking and mobile communication to portable devices.

Wireless mobile computing will likely use the same Internet Protocol ("IP") protocols that provide networking over most fixed computer networks including the well-known Internet. IP, however, was originally designed for fixed networks without mobile wireless nodes. The basic architecture for mobile IP data networking is also emerging and described in several publications, including the Request for Comments document RFC 2002 (1996) and in the textbook of Charles E. Perkins, *Mobile IP Design Principles and Practices*, Addison-Wesley Wireless Communications Series (1998), both of which are fully incorporated by reference herein. While IP networks are still expanding in popularity, wireless IP is the next frontier in mobile computing.

Needed are more methods and techniques to interface the wireless radio network with conventional data packet networks.

SUMMARY OF THE INVENTION

The present invention represents an improvement to the interface between wireless mobile networks and packet data networks. The present embodiments contemplate a modified Mobile IP protocol combined with a modified Generic Routing Encapsulation ("GRE") data tunneling protocol to implement the air-to-packet network or Radio-Packet ("R-P") interface. Generally, the modified Mobile IP interface with appropriate extensions is used for call control signaling and the modified GRE tunneling is used to transport user data. The Mobile IP call signaling messages may operate over User Datagram Protocol ("UDP") [RFC 768] which in turn is placed in the payload portion of an IP or UDP/IP Packet and manage the R-P connections. Modified GRE frames are used for transport of user traffic, such as PPP frames or link layer PDUs between the mobile station and the Packet Data Serving Node ("PDSN").

In the preferred embodiment, each mobile node communicates with a Radio Node ("RN") providing a Radio Node Mobile Agent ("RNMA") for each mobile node call connection to facilitate connectivity from the mobile network device to the packet network. Each RNMA is preferably allocated a Home Agent Address, referred to a "RNHomeAddress", assigned upon RNMA creation. Preferably, each RNHomeAddress is unique within the RN. The RNMA in the exemplary embodiment uses Mobile IP signaling to register the allocated RNHomeAddress using a Radio Node Foreign Agent ("RNFA") to send a Registration Request message. The RNHomeAddress will be assigned to the Home Address field of the Registration Request message.

After successful registration, the link layer session mapping has been successfully established and the call connection may be used to transport user data from the mobile device. For example, Point-to-Point Protocol ("PPP") frames may pass data over the connection in both directions using a modified GRE framing. The GRE standard in RFC 1701 specifies a protocol for performing encapsulation of an arbitrary network layer protocol over another arbitrary network layer protocol. In the preferred embodiment, the GRE header is modified to accept the RNHomeAddress as a Session ID value. In the exemplary embodiment, the same RNHomeAddress in the Home Address field of Mobile IP registration message is used with the Session ID used in GRE Header. Preferably, the Home Address inside the GRE header is used as a Session ID to identify each different link layer session.

The presented embodiments have several advantages. The present embodiments eliminate the necessity of a separate Tunneling ID and Session ID as used in other protocols. Preferably, the proposed protocol is independent of the details of the physical and link layer technologies over which the R-P connection is established. Each call connection is uniquely identified by the pair value (Home Address, Care-of Address). The Mobile IP/GRE tunneling is connectionless although it carries connection-oriented Link Layer session such as PPP. Eliminated is the need for a separate tunneling ID and Session Id as used in other protocols.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

In the following description, reference will be made to the appended drawings, wherein like reference numbers refer to like elements in the various views, and in which.

DETAILED DESCRIPTION OF THE PREFERRED EMBODIMENT OF THE INVENTION

Figure 1:
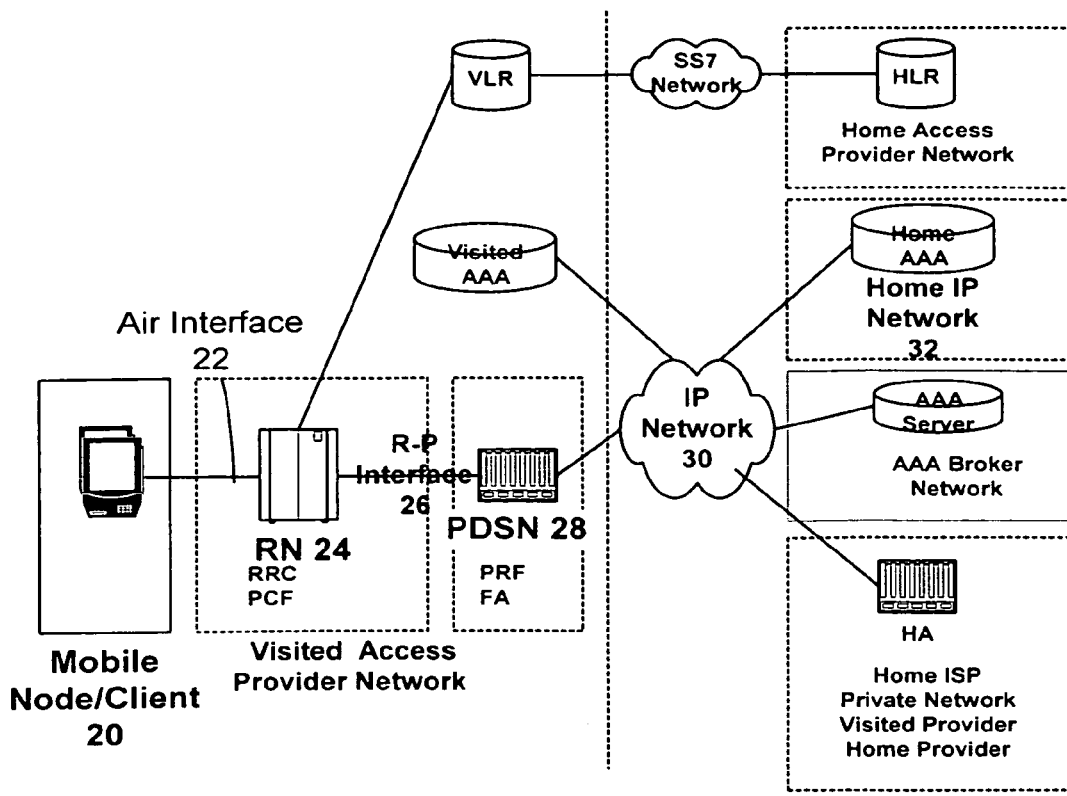
FIG. 1 is an illustration of a mobile networking access system of the preferred embodiment.

With reference to FIG. 1, shown is the overall schematic view of a network access system enabling wireless access to a data packet networks to provide mobile voice and data networking according to an exemplary embodiment of the present invention. A plurality of mobile stations or mobile nodes 20 allows a portable handheld device such as a Personal Digital Assistant ("PDA") with a wireless radio air interface 22 to access data networks including an Internet Protocol ("IP") network 30 and its home network 32. The IP network 30 may provide access to a number of other networks, databases, resource or network services. The mobile node 20 is associated with a Home IP network 32 which is its permanent home network service. The basic architecture of the network access system is described in "Network Access Methods, Including Direct Wireless to Internet Access," application Ser. No. 08/887,313 filed Jul. 3, 1997, of which this application is a continuation-in-part and the entire contents of which are fully incorporated by reference herein.

In this preferred embodiment, the mobile node 20 preferably includes an air interface 22 providing wireless communication capability such as a 3G CDMA (Code Division Multiple Access) network providing a wireless high-speed packet data service. 3G CDMA is an emerging standard for next generation wireless voice and data communications network. Of course, it should be understood that other wireless protocols may also be used. The wireless high-speed packet data service 22 can provide users mobile access to data networks such as an IP network or the Internet while moving about a city, walking down the street or traveling in cars, trains, etc.

The wireless air interface 22 is preferably provided by a base station ("BS") or Mobile Switching Center ("MSC") including a Radio Node ("RN") 24 implementing the wireless communication network 22 to a plurality of mobile stations 20, such as a 3G CDMA wireless communication system. The RN 24 includes the Radio-Packet ("R-P") interface 26 that provides the communication interface to allow the wireless network RN 24 to communicate to the Packet Data Serving Node ("PDSN") 28 in order to transmit information between the mobile stations 20 and the IP network 30. Such a R-P interface 26 may be used with, for example, 3G CMDA high-speed packet data service as well as future voice over IP services. The R-P interface 26 provides many different functions, including Packet Control Function ("PCF") to PCF Handoff to manage link layer mobility, tunneling user PPP frame from RN (Radio Node, or BSC) to PDSN (Packet Data Serving Node) 28 and vice versa, allocating PDSN 28 during PCF to PCF handoff, supporting QoS (Quality of Service) for user data tunneling, and supporting packet data billing within PDSN 28. Generally, the PDSN 28 provides an interface to access a packet network such as the Internet 30.

In the Mobile IP scheme according to the RFC 2002 Mobile IP standard, the mobile node 20 is identified by its "home address" on its home IP network 32, regardless of the mobile node's current means of accessing or current attachment point to the network. To facilitate mobile networking while away from its home network 32 and accessing its home network 32 remotely over the air interface 22, the mobile node 20 is also associated with a "care-of address" which provides information specific to its current point of attachment to the network. The Mobile IP protocol utilizes mobility agents, such as foreign and home agents, to provide the mobile node 20 access to network resources and its home network 32. Generally, a foreign agent allows for registering a care-of address with a home agent in order to address packets to the mobile node 20 utilizing a network tunnel connection between the home and the foreign agent. The home agent sends datagrams destined for the mobile node 20 through a network tunnel connection from the home agent to the foreign agent care-of address. Foreign and home agents are described in more detail below.

With this Mobile IP scheme, a mobile node 20 is given a long-term IP address or home address on a home network in the same way a permanent IP address is given to a stationary host on the network. The care-of address associated with the mobile node 20 is then utilized to reflect the mobile node's current point of attachment accessing the network.

Mobility Agents

The basic Mobile IP scheme is more specifically described in RFC 2002, which is hereby fully incorporated by reference. Generally in Mobile IP communication, a wireless mobile node 20 communicates with a terminal on an IP network 30 by means of a foreign agent and a home agent as introduced above. The foreign agent provides routing services for the mobile node 20 while it is registered with the foreign agent. Typically, foreign agent functionality is incorporated into a router or network access server chassis located on the mobile node's visited network, such as the RN 24. The foreign agent de-tunnels and delivers datagrams to the mobile node 20 that were tunneled by the mobile node's home agent.

A home agent is preferably located on a router on the mobile node's home network 32 that tunnels datagrams for delivery to the mobile node 20 via the foreign agent when the mobile node 20 is away from its home network 32. The home agent preferably maintains current location information for the mobile node 20, through a variety of possible mechanisms, such as described in the patent application of Richard J. Dynarski, et al., "Dynamic Allocation of Wireless Mobile Nodes Over an Internet Protocol (IP) Network", Ser. No. 09/233,381, which is incorporated by reference herein. When one or more home agents are handling calls for multiple mobile nodes simultaneously, the home agent(s) are providing, in essence, a service analogous to virtual private network services. Each mobile node 20 is typically associated with a separate home network and the routing path from that home network 32, through the home agent, to the foreign agent and mobile node 20. Different arrangements of home and foreign agents are described further in the application of Yingchun Xu et al., entitled Mobile Internet Protocol (IP) Networking With Home Agent And/Or Foreign Agent Functions Distributed Among Multiple Devices, application Ser. No. 09/354,659, filed Jul. 16, 1999 and Virtual Home Agent Service Using Software Replicated Home Agents, application Ser. No. 09/248,617, filed on Feb. 25, 1999, both of which are fully incorporated by reference.

The traffic tunneled or exchanged between the foreign agent and the home agent preferably includes control traffic, e.g., registration request and registration reply messages and session control messages, and user data traffic. The control traffic typically terminates at the home agent. The data traffic is routed through from the mobile node's home network 32 to a second network, such a IP network 30 for delivery to the target host. The target host could be connected to the home network by any arbitrary number of intermediate IP networks, or could be on the mobile node's home network.

Thus, from the above discussion, it can be seen that the home agent can perform several tasks for the foreign agent and mobile node 20. First, the home agent can perform an authentication and registration process to determine whether the mobile node 20 is authorized to access the home network 32. This may involve checking the identification of the mobile node 20 (such as, through use of the mobile node's unique serial number or manufacturing number), password authentication, and possibly checking that the mobile node's account is current and paid in full. The home agent registration and authentication functions may be performed in conjunction with, or with the assistance of, a second device, such as an authentication, authorization and accounting server such as a RADIUS server. See the patent application of Yingchun Xu, Ser. No. 08/887,313 filed Jul. 3, 1997 for further details.

Second, the home agent tunnels data from the target host to the foreign agent and also provides tunneling services in the reverse direction, i.e., provide packet re-addressing for traffic from the foreign agent to the host. To coordinate tunneling in the reverse direction, the home agent provides a forwarding "care-of" address to the foreign agent to tell the foreign agent where to tunnel traffic from the mobile node 20 so that it can be sent to the host. This forwarding address is typically contained in a Registration Reply message sent to the foreign agent notifying the foreign agent that the mobile node is authenticated to communicate in the home network. Registration Request and Reply messages are described further in more detail herein. The home agent also receives the tunneled traffic from the foreign agent for routing onto the home network, and therefore the forwarding address is the home agent's IP address.

The foreign agent also performs several tasks for the mobile node 20, similar to that of the home agent. First, the foreign agent has to handle the registration and session control aspects for the mobile node 20, including sending Registration Request messages to the home agent and processing Registration Reply messages. Second, the foreign agent has tunneling responsibilities for forwarding data packets to the home agent for ultimate distribution to the destination, and de-tunneling data from the home agent and forwarding the data to the mobile node.

Figure 2:
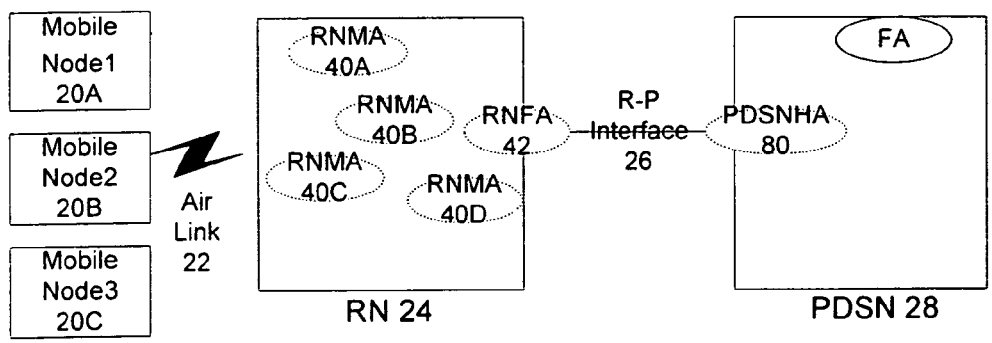
FIG. 2 is an illustration of a mobile IP networking system in accordance with a preferred embodiment of the invention showing the mobility agents, foreign and home agents according to the preferred embodiment.

FIG. 2 shows an exemplary architecture of the preferred embodiment of the network access system providing wireless access to a plurality of mobile nodes 20A, 20B, 20C through mobile air interface 22, RN 24 and PSDN 28. The Mobile Nodes 20A, 20B and 20C access the RN 24 via the air interface 22 provided by a cellular radio network such as a 3G CDMA network discussed previously. In this preferred embodiment, the RN 24 emulates the foreign agent functions and the PDSN 28 implements the home agent functions described above. Both home agent and foreign agent functions described above will be mapped into Packet Control Function ("PCF") (part of Radio Node function) as Radio Node Mobile Agent ("RNMA") 40 and Radio Node Foreign Agent ("RNFA") 42.

In this embodiment, the RN 24 preferably includes a plurality of Radio Node Mobile Agents ("RNMA") 40A, 40B, 40C and 40D implementing the Mobile Agent functionality. RNMA 40A–D are logical entities inside RN 24 that may be embodied as a software process. A RNMA 40A–D will preferably be created for each call connection rather than for each Mobile Node 20. Each Mobile Node 20A–C may have more than one call connection, so a Mobile Node may have more than one corresponding RNMA 40A–D inside the serving RN 24.

Each RN 24 also preferably creates a foreign agent functional entity during boot time, referred to as Radio Node Foreign Agent ("RNFA") 42 in this description. Preferably, the Care-of Address (as defined in RFC 2002) of the RNFA 42 will be the IP address of the RN 24. The RNFA 42 address will also be used as R-P interface 26 data tunneling end point, which will be described in more detail below.

In this embodiment, the PDSN 28 will also create a corresponding home agent functional entity during boot time referred to as a PDSN Home Agent ("PDSNHA") 80. Preferably, the Home Agent Address as defined in RFC2002 of PDSNHA 80 will be the IP address of PSDN 28 used as R-P interface 26 data tunneling end point. It should be understood that the RNFA 42 and PDSNHA 80 functions are only the functional simulation of Mobile IP foreign agent function and home agent function respectively. They are used as foreign agent and home agent function for RNMA registration, not for Mobile Node registration.

Each RNMA 40A–D preferably allocates a Home Agent Address (a 32-bit value) as defined in RFC 2002 that will be unique within each RN 24. Preferably, the Home Agent Address will be assigned during RNMA 40A–D creation. It should be understood that the Home Agent Address used here is preferably different than the permanent home address for a Mobile Node 20. In this embodiment, the Home Agent Address is a value local to R-P interface 26 and is not related to the permanent home address for Mobile Nodes 20A–C. The Home Address will be referred to as "RNHomeAddress" in following description.

Generally, a mobile node 20 initiates a packet data call by sending a call origination message via RN 24. The RN 24 interacts with other cellular network entities providing an air interface 22, such as a 3G CDMA wireless communication network for authenticating the mobile node 20 and setting up a traffic channel with the mobile node 20. After connection, a packet data service option such as RLP synchronization between the mobile station 20 and RN 24 would proceed. If there is no active R-P interface connection 26 for the mobile, a R-P connection 26 between the RN 24 and the PDSN 28 is initiated. The RN 24 preferably initiates the setup of the R-P connection 26 with the PDSN 28 by sending a Registration Request message to the PDSN 28. In addition to the message extensions described in RFC 2002, the Registration Request message should include the CDG-First-Time-Registration Parameter. The PDSN 28 may accept or reject the connection request. If the connection setup request is accepted and the PDSN 28 returns a Registration Reply message with an accept indication, and the packet data call would be connected through the just established R-P connection 26.

A Mobile Node 20 preferably registers with its home agent using a Registration Request message so that its home agent can create or modify a mobility binding for that mobile node (e.g., with a new lifetime) to access the mobile node 20. In the preferred embodiment, each RNMA 40A–B preferably uses Mobile IP signaling to register the allocated RNHomeAddress by sending a Registration Request message to PDSNHA 80 through RNFA 42. Messages preferably use the Mobile IP DP port 434 with control messages sent within a UDP datagram. For example, the initiator of a RP connection 26 selects an available UDP port and sends a Registration Request message to the desired destination PDSN 28. Using the independent implementation of Mobile IP based signaling over UDP, a protocol stack for signaling on the interface can be implemented. Because both RNMA 40A–B and RNFA 42 are co-located within the same entity RN 24, Agent Discovery procedure as described in RFC2002 is not necessary. The RNHomeAddress will be the assigned to the Home Address field of the Registration Request message and the PDSN 26 R-P data tunneling endpoint will be the Home Agent Address within the Registration Request message. The Registration Request message and extensions are described in more detail in RFC 2002.

Typically, the Registration Request message may be relayed to the home agent by the foreign agent through which the mobile node 20 is registering, or it may be sent directly to the home agent in the case in which the mobile node is registering a co-located care-of address. Accordingly, Mobile IP according to RFC 2002 defines two different registration procedures, one via a foreign agent that relays the registration to the mobile node's home agent, and one directly with the mobile node's home agent. Several rules generally determine which of these two registration procedures apply in any particular circumstance.

For example, if a mobile node 20 is registering a foreign agent care-of address, the mobile node 20 preferably registers via that foreign agent. If a mobile node is using a co-located care-of address, and receives an Agent Advertisement from a foreign agent on the link on which it is using this care-of address, the mobile node 20 should register via that foreign agent (or via another foreign agent on this link) if the 'R' bit is set in the received Agent Advertisement message. If a mobile node is otherwise using a co-located care-of address, the mobile node preferably registers directly with its home agent. If a mobile node 20 has returned to its home network and is (de)registering with its home agent, the mobile node should register directly with its home agent. Both registration procedures involve the exchange of Registration Request and Registration Reply messages.

When registering via a foreign agent such as in the preferred embodiment, the registration procedure utilizes the following four messages:
1. The mobile node sends a Registration Request to the prospective foreign agent to begin the registration process.
2. The foreign agent processes the Registration Request and then relays it to the home agent.
3. The home agent sends a Registration Reply to the foreign agent to grant or deny the Request.
4. The foreign agent processes the Registration Reply and then relays it to the mobile node to inform it of the disposition of its Request.

When the mobile node instead registers directly with its home agent, the registration procedure requires only the following two messages:
1. The mobile node sends a Registration Request to the home agent.
2. The home agent sends a Registration Reply to the mobile node, granting or denying the Request.

The registration messages use the User Datagram Protocol ("UDP") as well-known to those skilled in the art. A nonzero UDP checksum is preferably included in the header, and is checked by the recipient.

For a mobile node 20 seeking to establish a packet data call connection to communicate user data with a target host computer or a packet network, the RN 24 invokes a proxy-MN function for the mobile node 20 and assigns a MN-Proxy-ID to the packet data session. The RN 24 registers each session with the emulated home agent 80 function at the PDSN 28. The RN 24 places the MN-Proxy-Id in the Home Address field of the Registration Request message.

The structure of the Registration Request and Registration Reply message is generally as specified in section 3.3 of RFC 2002. In the preferred embodiment, the IP source address (IP header) and the care-of address field of the Registration Request message would be set to the IP address of the RN 24. The IP destination address of the IP header would be the address of the PDSN 28 designated for signaling. The Home Agent Address may be set to zeros.

If the PDSN 28 accepts the connection, it returns a Registration Reply with an accept indication and the Home Address or MN-Proxy-ID is the address of the PDSN 28 assigned for the connection. After a successful registration, both PDSNHA 80 and RNFA 42 preferably use the RNHomeAddress inside a GRE header 96 to identify each different link layer session. This value is preferably referred to within the GRE header 96 as the Session ID. The GRE header 96 is shown and described in more detail in the description of FIG. 4.

Thus, the RN 24 and PDSN 28 can use the RN IP Address and the Home Agent address returned in the Registration Reply message as the R-P interface connection 26 tunnel endpoints for the transport of user traffic. Accordingly, the MN-Proxy ID, RN IP Address and the Home Agent address form the unique link layer ID for each R-P connection 26. The RN 24 and PDSN 28 maintains an association of the mobile IMSI with the link ID for transport of user data over the R-P connection 26. The individual packet data calls are differentiated by the session ID field (MN-Proxy-Id) as implemented in the modified GRE header further described with reference to the description of FIG. 4.

Figures 3, 4:
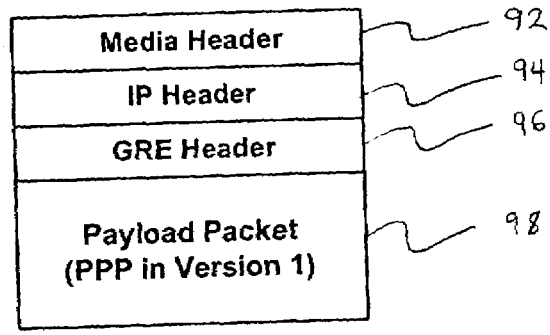
FIG. 3 is a diagram of a GRE encapsulated PPP packet according to a preferred embodiment of the invention.
FIG. 4 is a diagram of the modified GRE header according to a preferred embodiment of the invention.

With the R-P connection 26 in place, PPP frames may pass data over the connection in both directions using Generic Routing Encapsulation ("GRE") framing. Generally, the GRE standard in RFC 1701 specifies a protocol for performing encapsulation of an arbitrary network layer protocol over another arbitrary network layer protocol. The GRE protocol provides a simple, general purpose mechanism which is reduces the problem of encapsulation to a more manageable state. In the most general case, a system has a packet, the payload packet that needs to be encapsulated and routed. The payload is first encapsulated in a GRE packet, which possibly also includes a route. The resulting GRE packet can then be encapsulated in some other protocol and then forwarded. The entire encapsulated packet includes a delivery header, the GRE header 96 and the payload packet 98 itself. FIG. 3 shows the general structure of the IP packets carrying the GRE-encapsulated PPP frames over the R-P connection 26. The encapsulated packet includes a media header 92, IP header 94, modified GRE header 96 and payload 98.

Referring now to FIG. 4, shown is the modified GRE header 96 of the preferred embodiment. It should be understood that the GRE header may also include a number of other optional fields are defined in RFC-1701 such as Checksum, Offset, and Routing that are not shown for purposes of clarity of explanation. In the preferred embodiment, the modified GRE header 96 includes a Session ID 100 as Octets 5–8. The Session ID 100 value is preferably used during user link data transfer by PDSN 80 and RN 24 to multiplex and de-multiplex data from different link layer sessions. The link layer session mapping has been successfully established after a successful RNMA registration. Regarding the field of the GRE header 96 that is used as the Session ID 100 with RNHomeAddress, it can be left up to the final standard selection.

The general GRE header 96 specified in RFC 1701 is modified so that the Key field is used to represent the Session Id 100 containing the MN-Proxy-Id for the call connection. The flags and other fields in the GRE header 96 shown in FIG. 4 would be encoded as follows:

C (Checksum Present) '0'
R (Routing Present) '0'
K (Key Present) '1'
S (Sequence Number Present) '1'
s (Strict Source Routing Present) '0'
Recur (Recursion Control) '0s'
Flags '0s'
Vers (Version Number) '0s'
Protocol Type (PPP for Version 1) 'TBD'

In the preferred embodiment, the Checksum Present bit is set to 0, indicating no checksum is present. If the Checksum Present bit is set to 1, then the Checksum field is present and contains valid information. Typically, if either the Checksum Present bit or the Routing Present bit are set, BOTH the Checksum and Offset fields are present in the GRE packet.

Preferably, the Routing Present bit is set to 0, indicating no Routing field is present. If the Routing Present bit is set to 1, then it indicates that the Offset and Routing fields are present and contain valid information. If either the Checksum Present bit or the Routing Present bit are set, BOTH the Checksum and Offset fields are present in the GRE packet.

Key Present (K, Bit 2)

In the exemplary embodiment, the Key Present bit is set to 1, indicating that the Key field is present in the GRE header 96. In this embodiment, the Key is substituted as the Session ID 100 as described above. Preferably, the Sequence Number Present bit is set to 1, indicating that the Sequence Number field is present. Otherwise, the Sequence Number field is not present in the GRE header 96.

In addition, the Strict Source Route bit is preferably set to 0, indicating no Strict Source Route is present. It is recommended that this bit only be set to 1 if all of the Routing Information consists of Strict Source. Preferably, the three bits of the Recursion Control are set to 000, indicating no additional encapsulations are possible.

The Flags and Version (2 octets) encode the GRE flags in the first two octets. Bit 0 is the most significant bit, bit 15 is the least significant bit. Bits 13 through 15 are reserved for the Version field. Bits 5 through 12 are reserved for future use and should be transmitted as zero.

In the preferred embodiment, the Version Number bits (bits 13–15) are set to 0. The Protocol Type field (2 octets) contains the protocol type of the payload packet. In general, the value will be the PPP protocol type field for the packet. Currently defined protocol types are listed in RFC 1701. Additional values may be defined in other documents.

In this embodiment, the same value RNHomeAddress associating the Home Address in Home Address field of Mobile IP registration message with the Session ID 100 is also used in the GRE header 96. During registration, the GRE flag is set to force the use of Mobile IP GRE tunneling and the reverse tunneling flag is set to force data flow in both directions through PDSN 28. The logical entities Mobile Agent and foreign agent are created within RN 24 and the logical entity home agent described above is created within PDSN 28.

The R-P connection 26 is then used for the transport of user data carried on the packet data session preferably using GRE encapsulated PPP packets in the preferred embodiment. PPP frames are carried between the RN 24 and PDSN 28 encapsulated in modified GRE packets, which in turn are carried over IP. The PDSN 28 accepts the GRE frames, strips the GRE, and process them as normal incoming frames for the appropriate interface and protocol. In the other direction, the PDSN 28 encapsulates the PPP frames in GRE and the RN 24 strips the GRE before passing the frames over to the upper layers. At this point, the connectivity would be a point-to-point PPP session between the mobile user 20 and the PDSN 28.

According to this preferred embodiment, the RN 24 IP address and the Home Agent Address is used in the source address and destination address fields of the IP header 94 used with the GRE packet 90 of FIG. 4. A new Session ID field containing the MN-Proxy-ID in the modified GRE header 96 would indicate which packet data session a particular PPP packet belongs to. In this manner, several R-P connections 26 would be multiplexed on the same IP connection (RN IP Address and PDSN Home Agent Address) between an RN-PDSN pair.

The PPP protocol generally receives packets in sequence. The RN 24 and PDSN 28 preferably set the Session Id to the MN-Proxy-Id for the call. The Sequence Numbers would be per packet sequence numbers. Both the RN 24 and PDSN 28 wet the Sequence Number to zero at packet session startup. Each packet sent during a given session is assigned the next consecutive sequence number. If packets arriving at the RN or RDSN lose their sequencing across the R-P network, the receiving entity may attempt to re-sequence the packet before delivery to the PPP layer. For example, if packet number 4 & 5 arrive before packet 3, the receiving entity may wait for packet 3 before delivering packets 4 & 5 to the link layer (PPP layer). Failing arrival of packet 3, packets 4 and 5 would be delivered to the link layer and late arriving packet 3 would be discarded.

Normally, a packet network system which is forwarding delivery layer packets will not differentiate GRE packets from other packets in any way. However, a GRE packet may be received by a system. In this case, the system should use some delivery-specific means to determine that this is a GRE packet. Once this is determined, the Key, Sequence Number and Checksum fields if they contain valid information as indicated by the corresponding flags may be checked. If the Routing Present bit is set to 1, then the Address Family field should be checked to determine the semantics and use of the SRE Length, SRE Offset and Routing Information fields. The exact semantics for processing a SRE for each Address Family is defined in other protocols and documents well known to those skilled in the art.

Once all SREs have been processed, then the source route is complete, the GRE header should be removed, the payload's TTL MUST be decremented (if one exists) and the payload packet should be forwarded as a normal packet. The exact forwarding method can depend on the Protocol Type field as described above.

The present embodiments provide an efficient new interface between wireless radio networks and packet switching networks to simplify mobility management. The interface combines a modified mobile IP protocol with a modified GRE signaling to eliminate the necessity of a separate tunneling ID and Session ID as used in other protocols. Preferably, the proposed protocol is independent of the details of the physical and link layer technologies over which the R-P connection is established. Each call connection is uniquely identified by the pair value (Home Address, Care-of Address). The Mobile IP/GRE tunneling is connectionless although it carries connection-oriented Link Layer session such as PPP. Eliminated is the need for a separate tunneling ID and Session Id as used in other protocols.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only. The illustrated embodiments should not be taken as limiting the scope of the present invention.

For example, the steps of the flow diagrams may be taken in sequences other than those described, and more or fewer elements may be used in the block diagrams. While various elements of the preferred embodiments have been described as being implemented in software, in other embodiments hardware or firmware implementations may alternatively be used, and vice-versa.

The claims should not be read as limited to the described order or elements unless stated to that effect. Therefore, all embodiments that come within the scope and spirit of the following claims and equivalents thereto are claimed.

I claim:

1. A system for providing a mobile wireless communication network to access a destination comprising:
    an air interface utilizing a mobile networking protocol to provide mobile wireless communication service;
    a packet data network utilizing a modified generic routing encapsulation protocol modified to accept an address as a session in the key field of a GRE header ID to provide a fixed network communication service for communication from the air interface, wherein the address comprises a RNHomeAddress; and
    a tunnel connection to transport communication from the air interface to the destination through the packet data network,
    wherein the session ID identifies a link layer session independent of a tunnel ID.

2. The system of claim 1 further comprising:
    an interface between the air interface and the packet data network, wherein the interface encapsulates communications from the air interface.

3. The system of claim 1 wherein the tunnel connection carries communications in PPP frames.

4. The system of claim 3 wherein the PPP frames are carried with a modified GRE framing.

5. The system of claim 1 wherein the mobile networking protocol utilized by the air interface comprises a 3G CDMA interface.

6. A system for providing mobile Internet Protocol network interface for a mobile node, comprising:
    an air interface providing a network for the mobile node;
    a modified mobile IP protocol providing a mobile network interface for the air interface; and
    a modified Generic Routing Encapsulation protocol providing a packet network protocol, wherein the modified Generic Routing Encapsulation uses the key field of a GRE header to include a session id for the call connection and wherein the session ID identifies a link layer session independent of a tunnel ID.

7. The system of claim 6 wherein the session ID comprises a RNHomeAddress.

8. The system of claim 7 further comprising a Radio Node, the Radio Node comprising a RNHomeAddress wherein the RNHomeAddress is unique within the Radio Node.

* * * * *